(12) United States Patent
Parisy et al.

(10) Patent No.: US 8,061,994 B2
(45) Date of Patent: Nov. 22, 2011

(54) ROTORCRAFT BLADE, A ROTORCRAFT ROTOR PROVIDED WITH SAID BLADE, AND A METHOD OF FABRICATING SAID BLADE

(75) Inventors: Jean-Marie Parisy, Paris (FR); Rémi Metivier, Paris (FR)

(73) Assignee: Eurocopter, Marignane Cedex (FR)

( * ) Notice: Subject to any disclaimer, the term of this patent is extended or adjusted under 35 U.S.C. 154(b) by 515 days.

(21) Appl. No.: 12/270,293

(22) Filed: Nov. 13, 2008

(65) Prior Publication Data

US 2009/0155086 A1    Jun. 18, 2009

(30) Foreign Application Priority Data

Dec. 14, 2007  (FR) ...................................... 07 08698

(51) Int. Cl.
*F01D 5/30* (2006.01)

(52) U.S. Cl. ................ 416/193 A; 416/204 A; 416/217; 416/230

(58) Field of Classification Search .............. 416/193 A, 416/204 A, 212, 214 A, 215, 217, 219 R, 416/200 R, 230
See application file for complete search history.

(56) References Cited

U.S. PATENT DOCUMENTS

| | | | |
|---|---|---|---|
| 3,168,144 A | | 2/1965 | Capowich et al. |
| 3,554,668 A | * | 1/1971 | Wagle ........................ 416/220 R |
| 3,694,104 A | * | 9/1972 | Erwin ........................... 416/217 |
| 3,711,220 A | * | 1/1973 | Ramback et al. ......... 416/146 R |
| 3,923,422 A | | 12/1975 | Ianniello et al. |
| 4,251,309 A | * | 2/1981 | Class et al. ...................... 156/245 |
| 4,273,511 A | * | 6/1981 | Mouille et al. ............. 416/134 A |
| 4,338,062 A | * | 7/1982 | Neal ............................... 415/225 |
| 4,541,778 A | * | 9/1985 | Adams ........................ 416/193 A |
| 4,778,342 A | * | 10/1988 | Conlow .................... 416/220 R |
| 4,836,749 A | * | 6/1989 | Gavilan ......................... 416/221 |
| 4,877,376 A | * | 10/1989 | Sikorski et al. ................ 416/207 |
| 4,966,527 A | | 10/1990 | Merz |
| 5,074,753 A | * | 12/1991 | Covington et al. ............ 416/141 |
| 5,145,319 A | | 9/1992 | Glowacki |
| 5,259,728 A | * | 11/1993 | Szpunar et al. .................... 416/2 |
| 5,409,353 A | * | 4/1995 | Imbault ...................... 416/212 A |
| 6,213,719 B1 | * | 4/2001 | Violette et al. ................ 416/205 |
| 7,758,314 B2 | * | 7/2010 | Wilson et al. .................. 416/226 |

FOREIGN PATENT DOCUMENTS

| | | |
|---|---|---|
| DE | 1406494 | 11/1968 |
| EP | 0353672 | 2/1990 |
| EP | 0429353 | 5/1991 |
| FR | 2186380 | 1/1974 |
| GB | 1427158 | 10/1976 |

OTHER PUBLICATIONS

Search Report dated Jul. 1, 2008 in French application.

* cited by examiner

*Primary Examiner* — Michael Lebentritt
(74) *Attorney, Agent, or Firm* — Brooks Kushman P.C.

(57) ABSTRACT

A rotorcraft rotor blade (1) has a blade root (1') and a free end opposite from the blade root (1'), the blade (1) being provided at least with a spar (2) laid flat on a suction-side face (3) and a pressure side-face (4) of the blade (1), the main spar (2) being secured to an attachment fitting (5) at the blade root (1'). The attachment fitting (5) then includes first and second horizontal fastener bushings (10, 20), the first and second fastener bushings (10, 20) being both perpendicular to the span of the blade (1) and substantially perpendicular to an elevation direction (Z) that is substantially parallel to gravity (W), the elevation direction (Z) being perpendicular to the span.

12 Claims, 2 Drawing Sheets

ROTORCRAFT BLADE, A ROTORCRAFT ROTOR PROVIDED WITH SAID BLADE, AND A METHOD OF FABRICATING SAID BLADE

The present invention relates to a rotorcraft blade provided with a substantially horizontal spar laid flat respectively on the pressure-side face and on the suction-side face of the blade, and the invention also relates to a rotorcraft rotor having the blade arranged thereon, and to a method of fabricating the blade.

BACKGROUND OF THE INVENTION

A rotorcraft is provided with at least one engine that drives at least one main rotor that serves to provide the vehicle with lift and also with propulsion. The rotor comprises a hub that is set into motion by a rotor shaft that is driven by the engine, and a plurality of blades are arranged on the hub.

During their rotary motion, the blades are subjected to a force torsor and they are consequently subjected to centrifugal force together with multiple effects due to flapping, to drag, and to twisting, where twisting is caused in particular by changes in pitch that seek to modify the angle of inclination of the blades relative to the plane of the hub.

In addition, the hub generally includes a plurality of arms, optionally flexible in flapping, with the blades being arranged at the ends of the arms. The forces due in particular to centrifugal force are then transmitted to the non-flexible central zone of the hub.

A first known type of blade has a spar that extends from the blade root along the span of the blade and that is arranged at the leading edge of the blade. For convenience, that type of spar is referred to as a "leading-edge spar".

That type of spar is effective but is found to be inadequate for modern blades that present complex shapes, e.g. for acoustic reasons.

Document DE 1 406 494 discloses a blade provided with horizontal bores.

A second known type of blade has at least a first substantially horizontal spar that is laid flat respectively on the pressure-side and suction-side faces of the blade. Conventionally, the person skilled in the art tends to refer to such a spar that is laid flat as a "distributed spar" since the first spar is distributed over the cord of the blade on the suction-side and pressure-side faces thereof. The terms "distributed spar" and "flat-laid spar" or indeed "flat-laid distributed spar" as used below all relate to a spar of the same type.

It should be observed that it is possible to provide a second spar of the "leading-edge" spar type that is connected to the first spar, i.e. the distributed spar.

The first spar is then fastened to the hub of the rotorcraft rotor specifically for transmitting centrifugal forces thereto.

The second type of blade is entirely suitable for satisfying the requirements of modern helicopters, particularly if the distributed spar is associated with a leading-edge spar.

Nevertheless, and unfortunately, it is found to be difficult to attach a blade fitted with a distributed spar to a rotor hub.

Document U.S. Pat. No. 3,923,422 discloses a first device for performing such a function. At the blade root, the distributed spar is wound around a vertical fastener bushing that extends parallel to the axis of rotation of the rotor.

However, in order to wind vertically around a vertical fastener bushing, it is necessary for the distributed spar that is laid flat on the suction-side and pressure-side faces of the blade to be twisted. Such twisting through about ninety degrees suffers from the drawback of possibly being destructive insofar as the spar is mainly constituted by unidirectional fibers when making blades out of composite materials.

It is also difficult to lay the unidirectional fibers coming from the twisted section of the distributed spar flat on the suction-side and pressure-side faces of the blade.

The twisting thus leads to poor reproducibility from one blade to another both in terms of shape and also in terms of mechanical and vibration characteristics.

Furthermore, if filler elements need to be arranged in the blade, then they are of complex shape and they vary from one blade to another since the twisting of the spar is not reproduced identically. It then becomes difficult to automate blade fabrication.

It is then possible to envisage winding the spar "horizontally", in accordance with the second device described in document FR 2 186 380.

Nevertheless, that blade does not have fastener means. It is arranged in an arm of a rotorcraft hub that is of a very special shape, and it is then secured to the arm by means of a horizontal fastener pin that passes through the arm so as to hold the blade spar where it is wound.

Very likely for avoiding excessive flapping of the blade, the arm has top and bottom plates clamping onto the spar of the blade.

Nevertheless, that second device appears not to be particularly suitable for handling forces due to blade drag.

Consequently, the person skilled in the art tends to prefer solutions that make use of vertical fastener bushings, like the first device described above.

Given the specificity of the technical field of rotorcraft blades, it can be understood that documents EP 0 429 353 and EP 0 353 672 describe vanes that are provided with bushings that are vertical, i.e. extending perpendicularly to the plane of rotation of said vanes.

OBJECT AND BRIEF SUMMARY OF THE INVENTION

An object of the present invention is to provide a rotorcraft blade that includes at least one distributed main spar that can be reproduced easily, an attachment fitting of said blade also guaranteeing good control over the forces to which the blade is subjected, i.e. not only centrifugal forces but also forces due to flapping, to drag, and to twisting of the blade.

The invention provides a blade for a rotorcraft rotor, the blade having a blade root and a free end opposite from the blade root, and also having a main spar, namely a substantially horizontal distributed spar that is laid flat on a suction-side face and on a pressure-side face of the blade, the main spar being secured to an attachment fitting at said blade root.

The blade of the invention is remarkable the attachment fitting comprising first and second horizontal fastener bushings, the first and second fastener bushings thus being perpendicular both to the span of the blade and to an elevation direction extending substantially in the gravity direction for a main lift and propulsion rotor, the elevation direction being perpendicular to said span and being suitable for being perpendicular to the plane of rotation of the blade when the blade is driven in rotation by said rotor.

The longitudinal axes of the first and second bushings are thus horizontal, and therefore substantially parallel to the portions of the distributed spar that are laid flat on the suction-side and pressure-side faces of the blade. In addition, these longitudinal axes are substantially perpendicular to the span of the blade.

The first fastener bushing, i.e. the fastener bushing that is closer to the hub when the blade is arranged on a rotorcraft rotor, is thus intimately connected to the blade. This first fastener bushing takes up the major fraction of the blade forces that are transmitted via the flat-laid main spar, such as the centrifugal, twisting, and drag forces of the blade.

In addition, the first fastener bushing is extremely effective in transmitting centrifugal forces from the blade to the rotor hub.

The second fastener bushing, i.e. the fastener bushing that is closer to the free end of the blade, is associated with the first bushing. Given the small distance between the first and second fastener bushings, which distance may be less than or equal to one-tenth of the total span of the blade, the second fastener bushing has limited effect on taking up the forces due to blade drag or twisting.

However, the second fastener bushing contributes actively to taking up forces due to flapping of the blade.

In addition, using first and second horizontal fastener bushings serves to reduce the peening pressure exerted on the attachment fitting by the pins that serve to fasten the blade to the rotor hub.

As explained below, the first and second pins are engaged in the first and second fastener bushings. These first and second pins then exert pressure, referred to as peening pressure on the fastener bushings.

The peening pressure is inversely proportional to the contact area between a pin and the associated fastener bushing.

Using two fastener bushings in the horizontal position serves to maximize said contact area and thus to minimize the peening pressure, thereby preserving the physical integrity of the first and second fastener bushings and thus of the attachment fitting. The peening pressure can be halved compared with a conventional attachment system, which is far from being negligible.

Furthermore, using two fastener bushings in the horizontal position serves to maximize the stiffness of the fastener bushings, thereby enabling the fastener bushings to withstand higher forces during flapping or twisting of the blade, for example.

For equivalent size, it is found that it is possible to maximize the diameter of the fastener bushings, thereby maximizing their moment of inertia and thus maximizing their stiffness.

Similarly, for equivalent diameter and thickness, the moment of inertia of a fastener bushing in the horizontal position relative to its neutral axis while bending in flapping is greater than the moment of inertia of a fastener bushing in the vertical position relative to its neutral axis while bending in flapping. Consequently, the stresses exerted on the fastener bushing of the invention are minimized.

Furthermore, each fastener bushing optionally has a cylindrical outer coating of composite materials passing surrounding a metal inner part.

The metal inner part is a thin-walled metal tube that is covered in a cylindrical outer coating of composite material. The inner part prevents the pin that passes through the fastener bushing from rubbing against the composite materials of the outer coating. Consequently there is no risk of degrading the composite materials by wear, composite materials generally presenting poor resistance to friction abrasion, even if the relative movements between a pin and a fastener bushing are small.

Furthermore, it is advantageous for the metal inner part of the fastener bushing to include a flat facing towards the free end of the blade remote from said blade root.

Because of vibration of the blade, because of the rotation of the blade relative to its axis of rotation during a change of pitch, or indeed because of its flapping and drag movements, the metal inner part of the fastener bushing runs the risk of separating from the outer coating that covers it.

This separation would lead to clearance being created, thereby giving rise to local stresses liable to lead to an accident or to reduce the lifetime of the attachment fitting, and thus of the blade.

However, by placing a flat in the outside diameter of the metal part, the strictly cylindrical shape of its outer periphery is eliminated. The metal inner part of the fastener bushing then no longer presents any risk of turning and separating from the outer coating that covers it in part.

The flat in each bushing faces towards the free end of the blade. This serves in particular to prevent the outer coating being damaged at the sharp edges along the sides of the flat under the effect of centrifugal force.

If the flat were to face towards the blade root, then the centrifugal force exerted on the blade would tend to press the outer coating against the flat, which would lead locally to high levels of excess stress that could be destructive over sharp edges.

The metal part is prevented from moving relative to the outer coating by the flat and by adhesive. Sliding of the metal part in its outer coating is avoided by means of an obstacle, either by engaging rings that have shoulders, or by giving shoulders to the metal part itself.

Finally, the outer coating preferably possesses at least one elliptically-shaped recess. The metal inner part is then of a shape that allows it to match the shape of the elliptical recess in the outer coating.

This elliptical recess reduces the number of points of contact between the metal inner part and the pin that is inserted in said inner part. By placing these points of contact in preferred zones, the physical integrity of the attachment fitting is preserved.

Furthermore, the blade attachment fitting preferably includes a spacer system for spacing the first and second bushings apart, said spacer system being provided with at least one spacer means.

The spacer system thus serves to avoid the first and second bushings moving towards each other, whether during fabrication of the attachment fitting or when the blade is fastened to the rotor of a rotorcraft. In general, the spacer system becomes important when the blade is under stress, during a flight, or when stopped, for example.

Each spacer means may include a vertical rib that is perpendicular to a longitudinal direction of the fastener bushing and to the stand of the blade. The central rib guarantees that the spacer means are not damaged by the pressure exerted on the attachment fitting during polymerization thereof, and above all in operation.

In a first embodiment, the attachment fitting has an even number of spacer means arranged symmetrically between the first and second fastener bushings.

It can be advantageous to have a spacer system with a plurality of ribs. From a financial point of view, making single spacer means with a plurality of ribs is very expensive.

Consequently, it is preferable to fabricate a plurality of spacer means each having one rib, the spacer means being arranged relative to one another and adhesively bonded together in a symmetrical configuration so that the resulting spacer system ends up with the appearance of single spacer means having a plurality of ribs.

Furthermore, by placing two ribs of small thickness next to each other, a rib is obtained having twice that thickness. This disposition enables a spacer system to be made that is very strong and of reduced cost.

In a second embodiment, the spacer system comprises spacer means, namely a central beam provided with a vertical rib, together with two outer spacer elements each presenting a plane vertical face arranged against the central beam and a concave vertical face arranged against a respective one of the first and second fastener bushings.

When the attachment fitting comprises first and second fastener bushings spaced apart by a spacer system, the assembly comprising the first and second fastener bushings and said spacer system is covered by a primary coating of composite materials constituted by a stack of fiberglass slivers and fabric sheets.

Thus, the primary coating finishes off the attachment fitting cleanly and provides said assembly with good cohesion.

Furthermore, as explained below, it is advantageous for the outer surface of the primary coating to comprise a delamination fabric sheet, thus making it possible to omit a stage of sanding prior to applying adhesive. The delamination fabric sheet may then comprise polyester or polyamide.

The present invention relates not only to a blade provided with a novel attachment fitting, but also to a rotor fitted with an inventive mount to which said blade can be fastened.

Consequently, a rotorcraft rotor comprises a hub with a plurality of arms, and a blade of the invention is fastened to each arm via a respective mount.

The rotor is remarkable in that the mount comprises a U-shaped fastener zone with first and second side branches and an end wall, each side branch being provided with first and second openings, a first rotor pin is engaged in the mount so as to pass in succession through the first opening of the first side branch, the first fastener bushing in the blade, and then the second opening in the second side branch, and a second rotor pin is engaged in the mount so as to pass into succession through the second opening in the first side branch, the second fastener bushing of the blade, and then the first opening of the second side branch.

As explained above, this disposition enables the peening pressure that is exerted by the first and second pins to be limited.

Furthermore, using first and second fastener bushings, and thus using first and second pins, suffices to accommodate flapping of the blade, particularly when stopped with the blade being subjected solely to its own weight.

Finally, the second openings of the mount are advantageously closed in part by respective elastomer bearings, each comprising at least one layer of elastomer sandwiched between two layers of rigid material.

The elastomer bearings then contribute to damping flapping movements of the blade.

Furthermore, the invention also provides a method of fabricating a blade as described above, the method comprising the following steps:

a) fabricating first and second fastener bushings by placing an outer coating on each metal inner part;

b) placing a spacer system between said first and second fastener bushings;

c) covering the assembly comprising the first and second fastener bushings and said spacer system in a primary coating having an outer surface that includes a delamination fabric sheet;

d) polymerizing the attachment fitting constituted by the first and second fastener bushings, the spacer system, and the primary coating, the delamination fabric sheet being removed after polymerization in order to roughen the outer surface of the primary coating of said fastener fitting; and e) fabricating the blade by winding a main spar horizontally around said attachment fitting, the main spar possibly being wound degressively in the span direction and/or in the cord direction of the blade.

This fabrication method presents multiple advantages.

Firstly, the method provides complete control over the positioning of the component elements of the attachment fitting by eliminating any risk of slip.

It is common to observe slip taking place between elements of a blade attachment fitting during fabrication of the fitting. Conventionally, the person skilled in the art places in a mold both the elements of the fitting and also the elements constituting the blade, such as the spars, the foams, the ribs if any, the trailing edge ledges, or indeed the leading edge protective members, for example.

All of these elements can move or be moved while they are being put into place in the mold, which is often done manually. Similarly, they can move while the blade is polymerizing, since the resins involved remain fluid due to the pressures and temperatures implemented during polymerization.

In contrast, in the invention, the attachment fitting is prefabricated during steps a) to d). At the end of those steps, the attachment fitting is inspected to ensure that it is in compliance.

Furthermore, since the dimensions of the fitting are relatively small, unlike the dimensions of a rotorcraft blade, it is easier to control fabrication of the attachment fitting.

The method of the invention thus guarantees that an attachment fitting is obtained that is in compliance with its specification, and eliminates any risk of one of its parts slipping relative to another.

Secondly, the attachment fitting enables the main spar to be wound easily, the main spar being a distributed spar that is laid flat. It suffices to take the portion of the main spar that is laid flat on the suction side face and then to wind it horizontally around the attachment fitting so as to lay it flat on the pressure-side face of the blade.

There is thus no need to twist the spar in order to wind it around the attachment fitting.

Finally, and thirdly, step d) is of great importance since it enhances achieving a high quality connection between the main spar and the attachment fitting without any particular difficulty.

Step d) consists in particular in removing the delamination fabric sheet after the attachment fitting has polymerized. Thus, when the sheet is removed, the outer surface of the fitting is slightly degraded, with removal of this delamination sheet giving rise to roughness on the outer surface.

This roughness then enables the resin to bond easily onto the fitting. This characteristic is particularly important when the composite material constituting the main spar includes little resin so as to avoid reducing their strength. Consequently, it is advantageous for the outer surface of the attachment fitting to present said roughness.

It should be observed that the person skilled in the art generally seeks to obtain this result by sanding the surface in question. That method is effective but it is not necessarily reproducible from one part to another.

Furthermore, during step c), said primary coating can be built up by successively stacking a layer of fabric sheet on a sliver of fiberglass.

While making such a stack, a layer of unidirectional fabric sheet is placed between two fiberglass slivers, thereby avoiding firstly a "bunch" of fabric sheets secured to a "bunch" of fiber slivers, thereby optimizing the mechanical strength of the primary coating.

Finally, since each fabric sheet layer of the primary coating is unidirectional, step c) involves using a plurality of fabric sheet layers that are given different orientations so that the primary coating is orthotropic. For example, it is possible to use fabric sheets oriented at +45°, −45°, and 90°.

BRIEF DESCRIPTION OF THE DRAWINGS

The invention and its advantages appear in greater detail from the following description of embodiments given by way of illustration with reference to the accompanying figures, in which.

Elements present in more than one of the figures are given the same references in all of them.

MORE DETAILED DESCRIPTION

Figure 1:
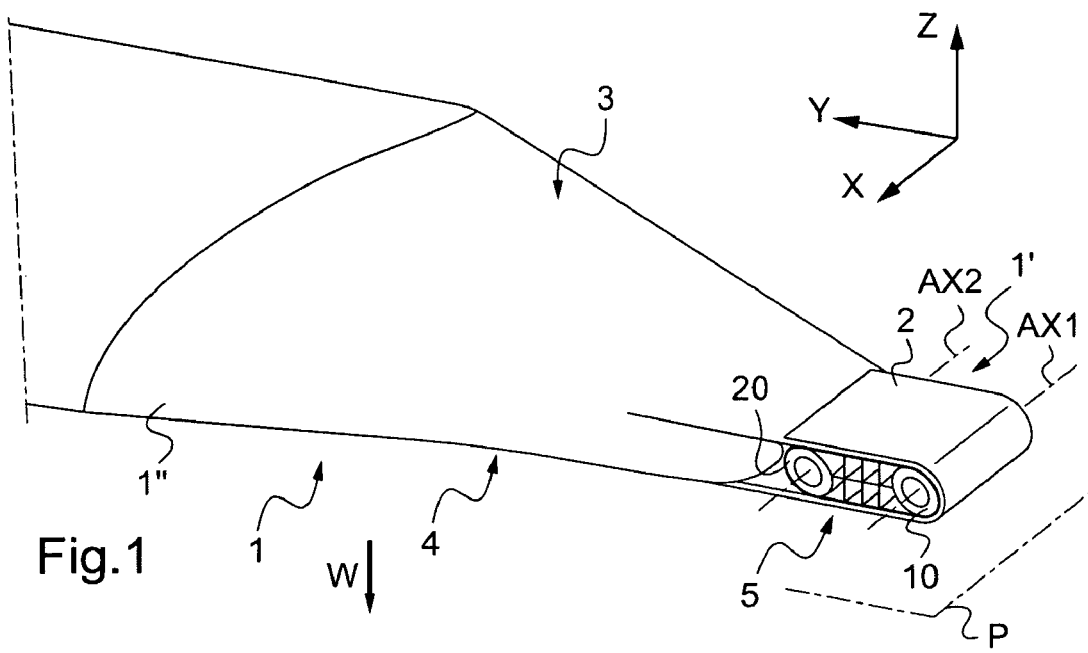
FIG. 1 is a view of a blade of the invention.

FIG. 1 shows a rotorcraft blade 1 of the invention.

Three mutually orthogonal directions X, Y, and Z are shown in FIG. 1.

The direction X is referred as being "longitudinal" insofar as the first and second fastener bushings 10, 20 of the attachment fitting 5 of the blade 1 extend locally in this direction.

Another direction Y is said to be "transverse". The span of the blade 1 extends in this transverse direction Y.

Finally, a third direction Z is referred to as the "elevation" direction and corresponds to the height dimension for the structures described. It can be seen that gravity W acts parallel to the elevation direction Z.

It should be specified that the directions X, Y, and Z are intimately associated with the blade. Consequently, the elevation direction Z is parallel to gravity when the blade 1 is at a certain angle of incidence. Since this angle of incidence can vary, e.g. when the rotorcraft pilot decides to change blade pitch, the elevation direction Z is not always parallel to gravity, but can be slightly inclined relative thereto.

Furthermore, it should be observed that the term "horizontal" refers to the horizontal X,Y plane defined using the longitudinal and transverse directions X and Y, and the term "vertical" refers to a vertical X,Z plane defined relative to the longitudinal and elevation directions X and Z.

The blade 1 has a blade root 1' for fastening to the hub of a rotorcraft rotor, whether a main rotor providing propulsion and lift or an anti-torque tail rotor, for example, and the blade also has a free end (not shown), said free end being located at the tip of the blade 1 remote from the blade root 1'.

Furthermore, the blade 1 is provided with a distributed main spar 2, the main spar 2 being considered as being substantially horizontal insofar as it is laid flat over the suction-side face 3 and pressure-side face 4 of the blade.

The main spar 2 is wound horizontally around and is secured to an attachment fitting 5 suitable for enabling the blade root 1' to be fastened to the rotor hub so that the main spar 2 can be laid flat on the suction-side face 3 and pressure-side face 4 of the blade.

It should be observed that the blade 1 also has a leading edge spar 1" that is connected to the main spar 2 by the usual means.

The fitting 5 for attaching the blade 1 is provided with first and second horizontal fastener bushings 10, 20 that are separated from each other by a spacer system 50. More precisely, the first and second fastener bushings 10, 20 are both perpendicular to the span of the blade and thus to the transverse direction Y, and also perpendicular to gravity W and thus to the elevation direction Z.

Figure 6:
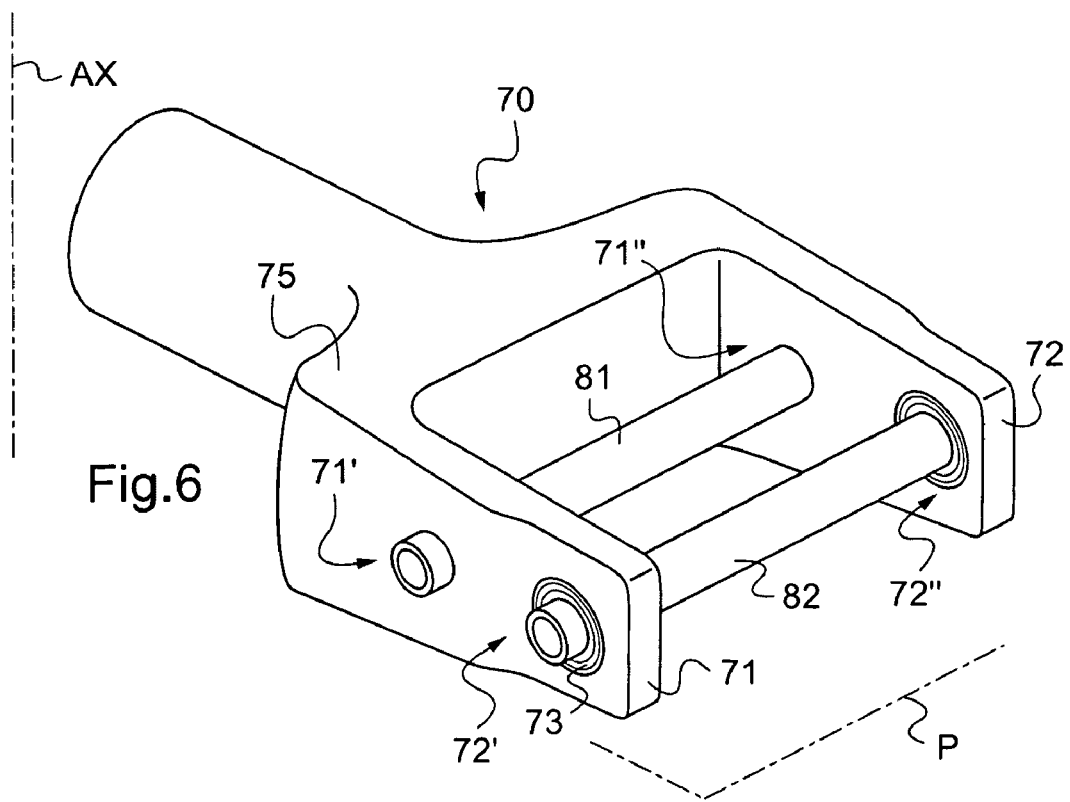
FIG. 6 is an isometric view of a rotor mount of the invention.

Consequently, the first and second fastener bushings are perpendicular to the axis of rotation (AX) of the rotor, shown diagrammatically in FIG. 6.

In addition, since the elevation direction is perpendicular to the plane of rotation (P), of the blade about the axis of rotation (AX), the first and second fastener bushings are parallel to said plane of rotation (P).

The longitudinal axes AX1 and AX2 of the first and second fastener bushings are thus horizontal and parallel to the longitudinal direction X.

Consequently, the first fastener bushing 10 takes up centrifugal forces and also the forces due to flapping, to twisting, and to drag of the blade 1.

In contrast, the distance L between the longitudinal axes AX1 and AX2 of the first and second fastener bushings 10, 20 is small, i.e. less than or equal to one-tenth of the span of the blade, so the second fastener bushing 20 contributes essentially to taking up centrifugal forces and forces due to flapping of the blade 1.

Figure 2:
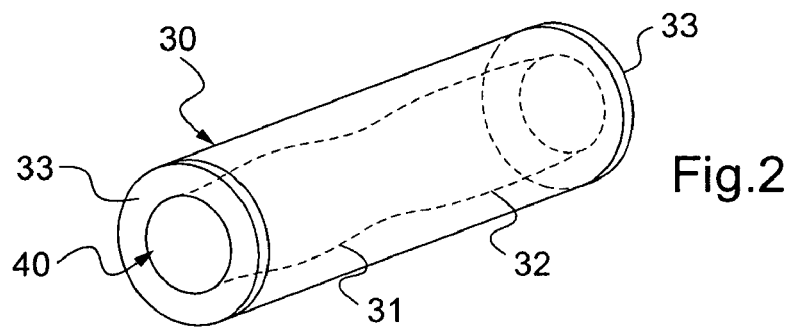
FIG. 2 is a diagrammatic view of a fastener bushing.

FIG. 2 is a view of a fastener bushing of the attachment fitting 5.

Each fastener bushing 10, 20 comprises an outer coating 30 surrounding an inner metal part 40, a thin-walled tube.

The outer coating possesses first and second elliptical recesses 31, 32. Consequently, the inner metal part 40 has a shape that enables it to co-operate with the elliptical recesses of the coating.

Specifically, during a step a) of the method of fabricating the blade 1, the internal metal part 40 is machined so as to give it the desired shape and then the outer coating 30 is put into place on said metal inner part 40 so as to fabricate the first and second fastener bushings 10, 20.

Similarly, it is possible to envisage providing shoulders 33 at the edges of the metal inner part so as to guarantee that it does not move in translation.

Once the first and second fastener bushings 10, 20 have been fabricated during a step b), a spacer system 50 is placed between the first and second fastener bushings 10, 20. The spacer system 50 prevents the first and second fastener bushings 10, 20 being able to move towards each other.

The spacer system 50 then comprises at least one spacer means provided with a vertical rib to guarantee that the spacer means can withstand the pressure exerted on the attachment fitting during polymerization.

Figure 3:
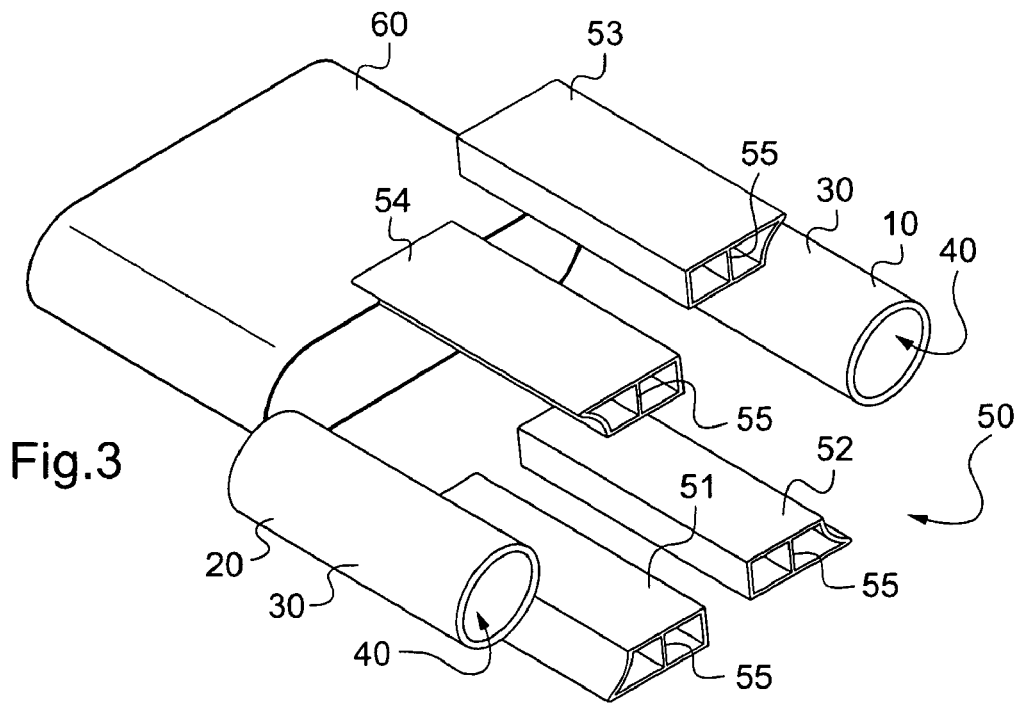
FIG. 3 is an exploded view of an attachment fitting in a first embodiment.

In a first embodiment, shown in FIG. 3, the spacer system 50 comprises an even number of spacer means, more precisely four spacer means 51, 52, 53, 54, each provided with a vertical rib 55 extending parallel to the vertical X, Z plane.

Figure 4:
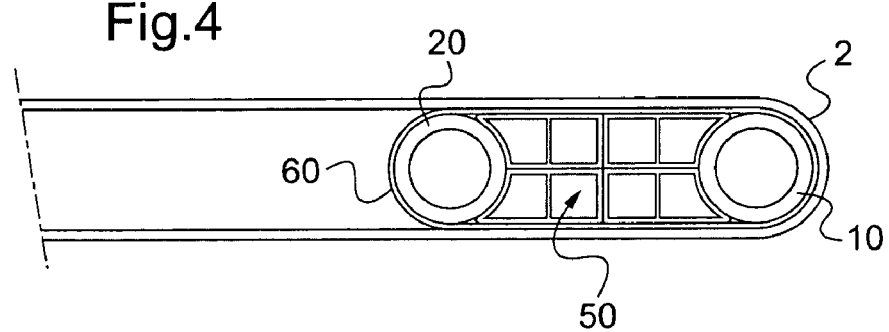
FIG. 4 is a cross-section of an attachment fitting in a first embodiment.

With reference to FIG. 4, the four spacer means 51, 52, 53, and 54 are bonded together in a mirror-symmetry configuration. The spacer system 50 thus comes into contact with the first and second fastener bushings 10, 20.

Figure 5:
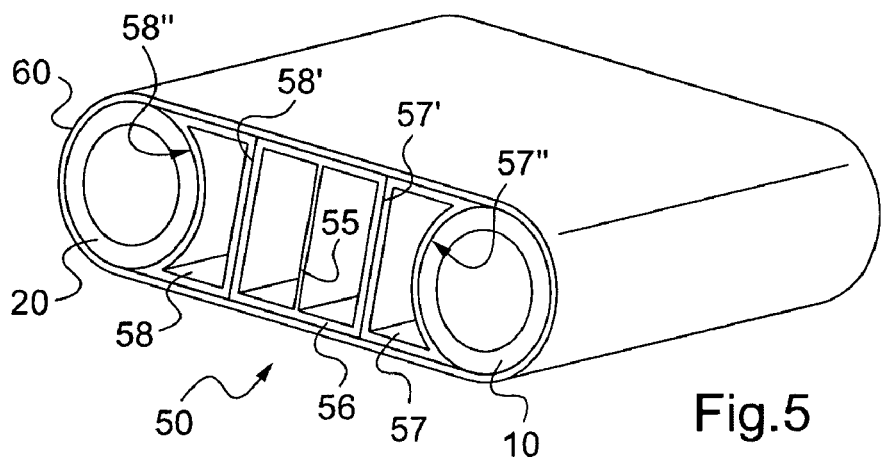
FIG. 5 is a section of the spacer system in a second embodiment.

In a second embodiment, as shown in FIG. 5, the spacer system 50 comprises a central beam 56 provided with a vertical rib 55, together with first and second outer spacer elements 57, 58.

Consequently, the first outer spacer element 57 is provided with a first plane vertical face 57' that is bonded to the central beam 56, and with a first concave vertical face 57" with its concave side facing the first fastener bushing 10 so as to come into contact with said first fastener bushing 10.

Likewise, the second outer spacer element 58 has a second plane vertical face 58' bonded to the central beam 56, and a second concave vertical face 58" with its concave sides facing the second fastener bushing 20 in order to come into contact with said second fastener bushing 20.

Thereafter, whatever the embodiment involved, during a step c), the assembly comprising the first and second fastener bushings 10 and 20 and the spacer system 50 is covered in a primary coating 60 of composite materials. The primary coating 60 comprises a stack of fiber slivers and fabric sheets, each fiber sliver being sandwiched between two fabric sheets.

During a step d), following step c), the attachment fitting 5 is polymerized, using the usual techniques, so as to finish off fabricating the attachment fitting 5.

The outer surface of the primary coating 60 advantageously includes a delamination fabric sheet, and this delamination fabric sheet is removed after the blade 1 has polymerized.

Thereafter, pores are created in said outer surface.

Finally, during a step e), the main spar 2 of the blade 1 is wound around the attachment fitting 5. The pores that result from removing the delamination fabric sheet enhance adhesion between the spar 2 and the fitting 5.

With reference to FIG. 6, once the blade 1 has been completed, it needs to be mounted on a rotorcraft, and more precisely on the hub of a rotorcraft rotor.

For this purpose, the rotor hub has a mount 70 providing a U-shaped fastener zone with first and second side branches 71, 72 and an end wall 75.

The first and second side branches 71 and 72 are pierced, each possessing first and second openings 71', 71", 72', 72".

The second openings 72', 72" are preferably fitted with an elastomer bearing 73 closing them in part, the elastomer bearing acting somewhat as a damper.

Under such conditions, each elastomer bearing comprises a stack involving at least one layer of elastomer and at least one rigid layer, each elastomer layer being sandwiched between two rigid layers.

To fasten the blade 1, the blade root 1' is initially positioned between the first and second side branches 71, 72 of the mount.

Thereafter, a first pin 81 is inserted in the first opening 71' of the first side branch 71 and caused to penetrate in succession through the first fastener bushing 10 of the fitting 5 and then through the first opening 71" of the second side branch 72.

Similarly, a second pin 82 is inserted in the bearing 73 in the second opening 72' of the first side branch 71 and is then caused to penetrate successively through the second fastener bushing 20 of the fitting 5, and then through the bearing 73 in the second opening 72" of the second side branch 72.

To finish off fastening the blade 1 to the mount 70, it suffices to use the usual means for preventing any movement of the first and second pins 81, 82 in translation relative to the attachment fitting 5 of the blade 1.

Naturally, the present invention can be subjected to numerous variations as to its implementation. Although several embodiments are described, it will readily be understood that it is not conceivable to identify exhaustively all possible embodiments. It is naturally possible to envisage replacing any of the means described by equivalent means without thereby going beyond the ambit of the present invention.

What is claimed is:

1. A rotorcraft rotor blade (1) having a blade root (1') and a free end remote from said blade root (1'), said blade (1) being at least provided with a main spar (2) laid flat on a suction-side face (3) and a pressure-side face (4) of the blade (1), said spar (2) being secured to an attachment fitting (5) at said blade root (1'), wherein said attachment fitting (5) comprises first and second horizontal fastener bushings (10, 20), said first and second fastener bushings (10, 20) being firstly perpendicular to the span of the blade (1) and secondly substantially perpendicular to an elevation direction (Z), said elevation direction being perpendicular to said span and to the plane of rotation of the blade when said blade is rotated by said rotor.

2. A blade according to claim 1, wherein each fastener bushing (10, 20) comprises a cylindrical outer coating (30) of composite material surrounding a metal inner part (40).

3. A blade according to claim 2, wherein said outer coating (30) includes a flat facing said free end of the blade remote from said blade root.

4. A blade according to claim 2, wherein said outer coating (30) possesses at least one elliptically-shaped recess (31, 32).

5. A blade according to claim 1, wherein said attachment fitting (5) includes a spacer system (50) separating the first and second fastener bushings (10, 20), said spacer system (50) being provided with at least one spacer means (51, 52, 53, 54, 56).

6. A blade according to claim 5, wherein each spacer means (51, 52, 53, 54, 56) includes a vertical rib (55), said vertical rib (55) being perpendicular to a longitudinal axis (AX1, AX2) of a fastener bushing (10, 20) and to said span of the blade (1).

7. A blade according to claim 5, wherein said attachment fitting (5) has an even number of spacer means (51, 52, 53, 54) arranged symmetrically between said first and second fastener bushings (10, 20).

8. A blade according to claim 5, wherein said spacer system (50) comprises spacer means (56), i.e. a central beam (56) provided with a vertical rib (55), together with two outer spacer elements (57, 58) each presenting a plane vertical face (57', 58') arranged against said central beam (56), and a concave vertical face (57", 58") arranged against a respective one of said first and second fastener bushings (10, 20).

9. A blade according to claim 1, wherein said attachment fitting (5) comprises first and second fastener bushings (10, 20) spaced apart by a spacer system (50), the assembly comprising the first and second fastener bushings (10, 20) and said spacer system (50) being covered in a primary coating (30) of composite material made up of a stack of fiberglass slivers and fabric sheets.

10. A blade according to claim 9, wherein an outer surface of said primary coating (30) includes a delamination fabric sheet.

11. A rotorcraft rotor comprising a hub with a plurality of arms, a blade (1) according to claim 1 being fastened to a mount (70) of each arm, wherein said mount (70) has a U-shaped fastener zone provided with first and second side branches (71, 72) and an end wall (75), each side wall (71, 72) being provided with first and second openings (71'-72', 71"-72"), a first pin (81) of said rotor is engaged in said mount (70) so as to pass in succession through said first opening (71') of the first side branch (71), the first fastener bushing (10) of the blade (1), and then the first opening (71") of the second side branch (72), while a second pin (82) of said rotor is engaged in said mount (70) so as to pass in succession through said second opening (72') of the first side branch (71), the second fastener bushing (20) of the blade, and then the second opening (72") of the second side branch (72).

12. A rotor according to claim 11, wherein said second openings (72', 72") are closed in part by respective elastomer bearings (73) provided with at least one layer of elastomer disposed between two layers of rigid material.

* * * * *